United States Patent [19]

Allen et al.

[11] Patent Number: 4,667,287

[45] Date of Patent: May 19, 1987

[54] MULTIPROCESSOR MULTISYSTEM COMMUNICATIONS NETWORK

[75] Inventors: James C. Allen, San Jose; Wendy B. Bartlett, Los Altos; Hoke S. Johnson, III, San Jose; Steven D. Fisher, San Mateo; Richard O. Larson, Fremont; John C. Peck, Mountain View, all of Calif.

[73] Assignee: Tandem Computers Incorporated, Cupertino, Calif.

[21] Appl. No.: 437,399

[22] Filed: Oct. 28, 1982

[51] Int. Cl.⁴ .................. G06F 13/38; G06F 15/16
[52] U.S. Cl. ....................................... 364/200
[58] Field of Search ... 364/200 MS File, 900 MS File

[56] References Cited

U.S. PATENT DOCUMENTS

| | | | |
|---|---|---|---|
| 4,447,871 | 5/1984 | Terada et al. | 364/200 |
| 4,466,063 | 8/1984 | Segarra et al. | 364/200 |
| 4,470,114 | 9/1984 | Gerhold | 364/200 |
| 4,489,379 | 12/1984 | Lanier et al. | 364/200 |

*Primary Examiner*—Thomas M. Heckler
*Attorney, Agent, or Firm*—Townsend & Townsend

[57] ABSTRACT

A plurality of multiprocessor systems is arranged in a high speed network to allow any processor in one system to communicate with any processor in another system. The network is configured as a multi-node dual bidirectional ring having a multiprocessor system at each node. Packets of information may be passed around the ring in either of two directions and are temporarily stored in buffer memory locations dedicated to a selected destination processor in a selected direction between each successive transfer between neighboring nodes. The buffer locations are managed so that they can request an adjacent node to stop transmitting packets if the buffer is becoming full from that direction and request resumption of transmission of packets as the buffer empties.

1 Claim, 5 Drawing Figures

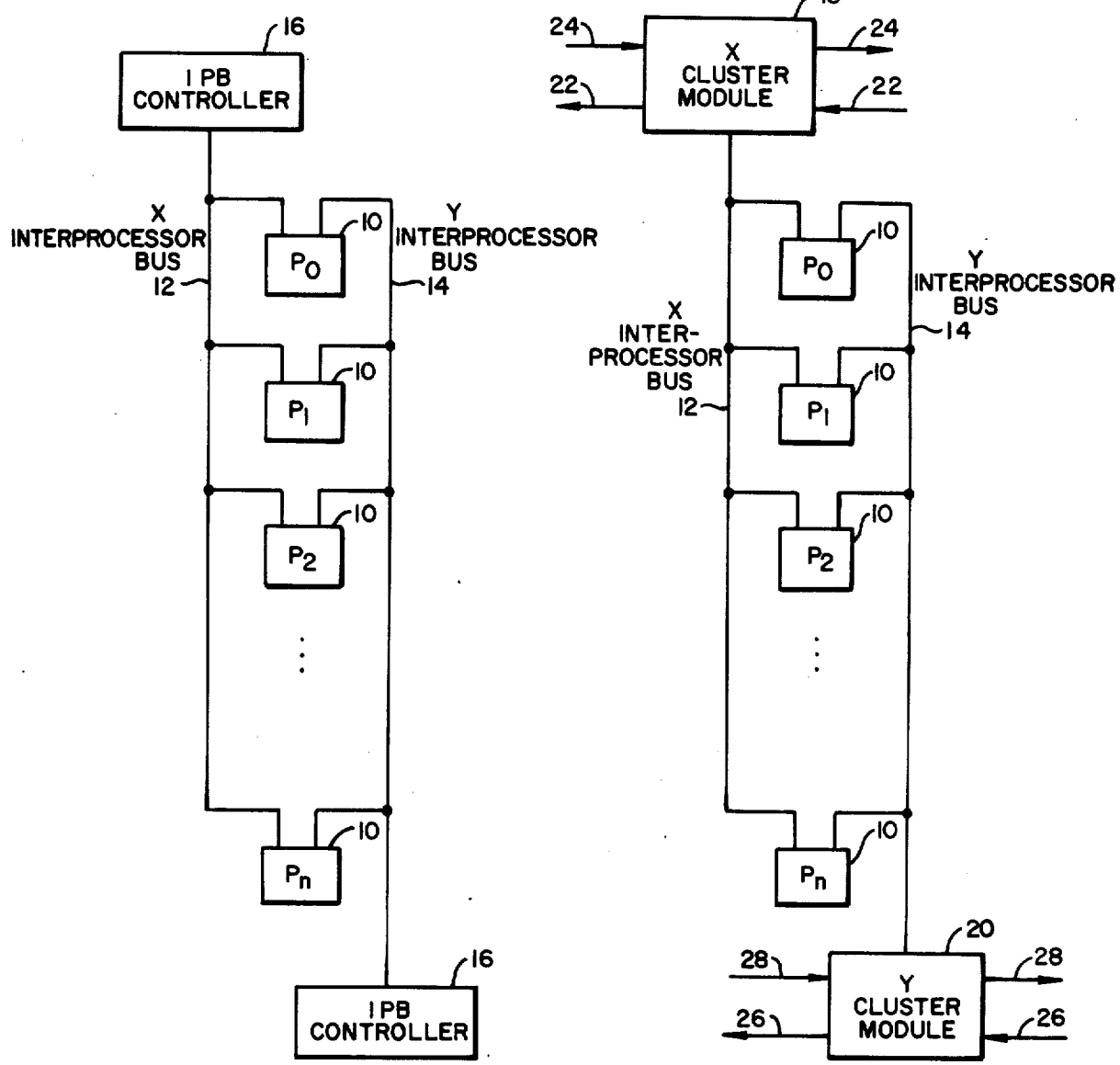
FIG._1.    FIG._2.

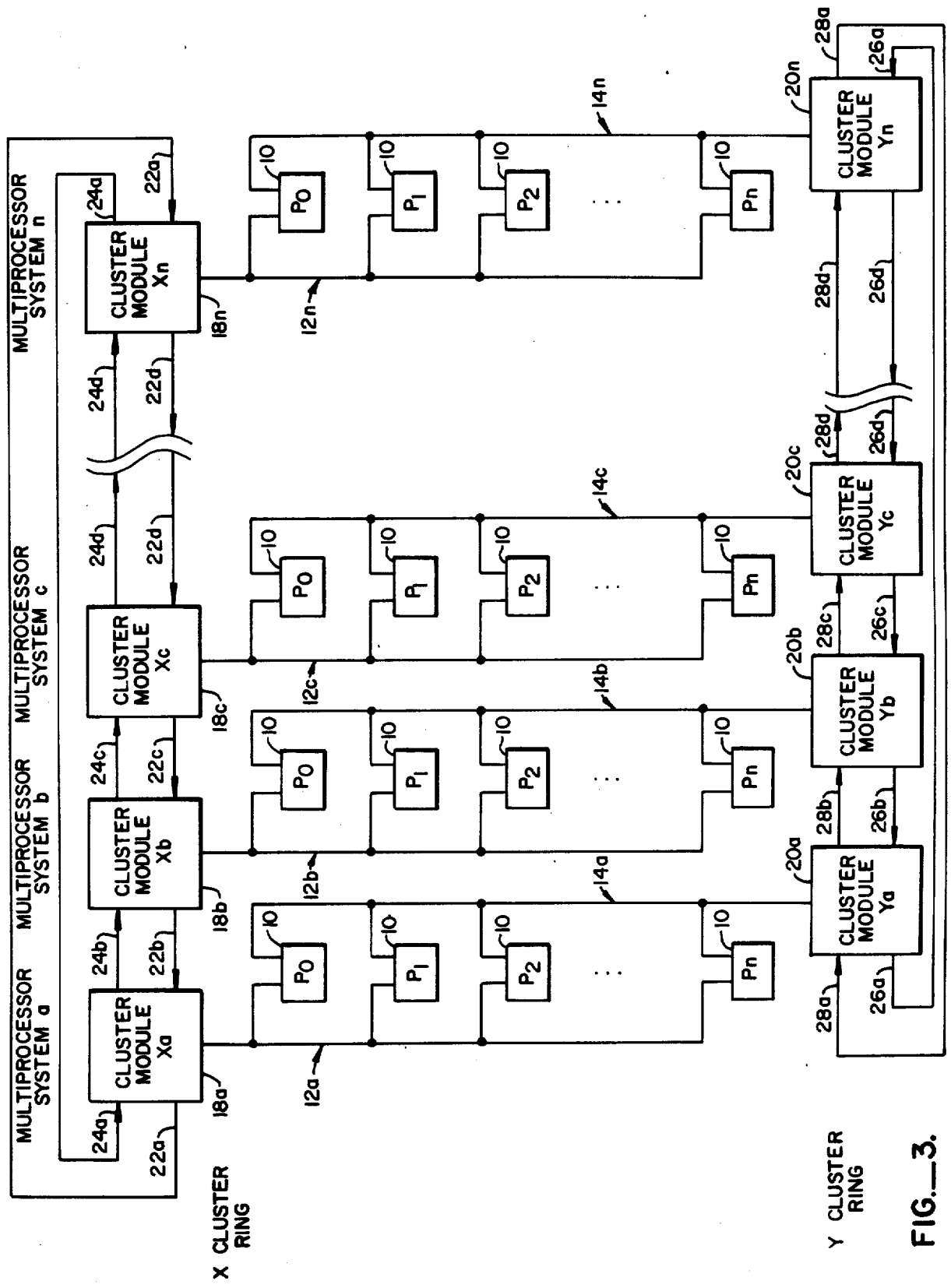
FIG._3.

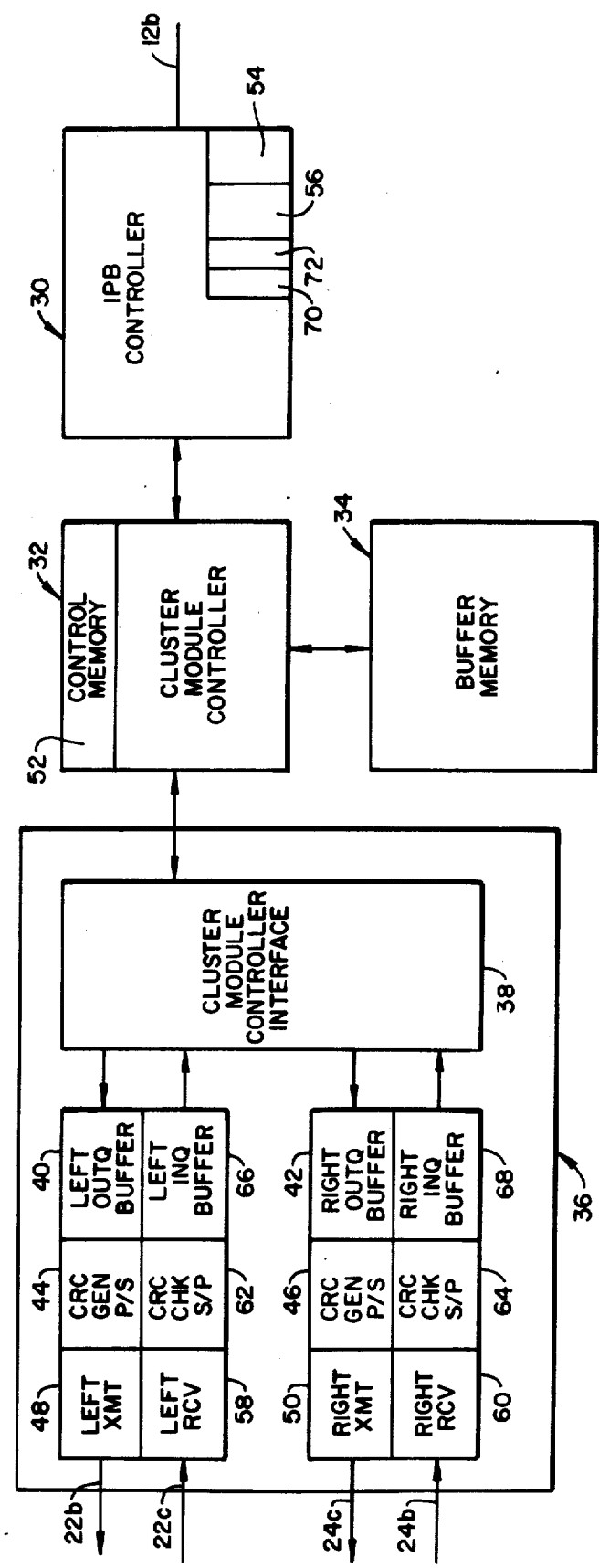
FIG._4.

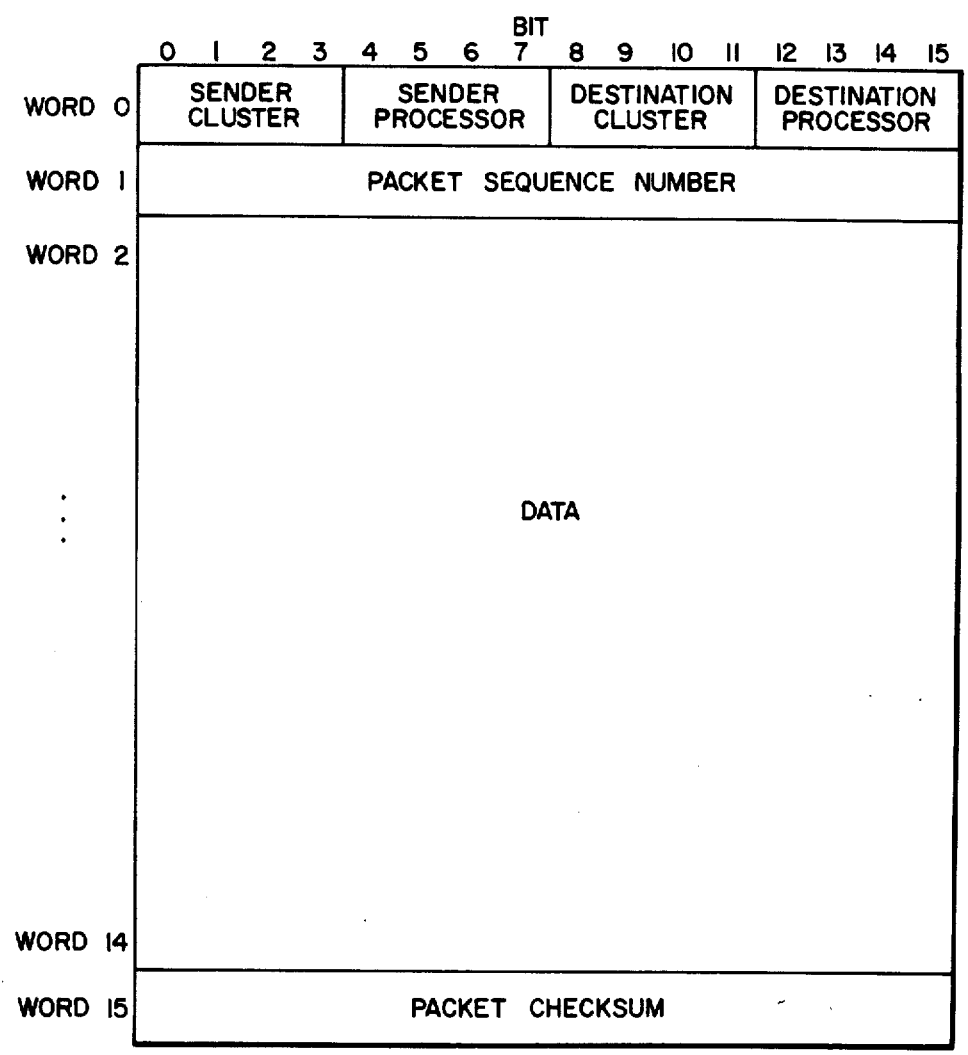
FIG._5.

MULTIPROCESSOR MULTISYSTEM COMMUNICATIONS NETWORK

FIELD OF THE INVENTION

The present invention relates to multiprocessor computer systems. More particularly the invention relates to multisystem networks of multiprocessor computer systems and the manner in which processors from one system communicate with processors in another system.

THE PRIOR ART

Connecting two or more multiprocessor systems together in a network is desirable in many applications, such as applications where there is a need for communications between separately managed systems. Also, there is a practical limit to the number of processors which can be included in multiprocessor systems. When system size limits are reached, the only manner in which processing power may be further expanded is by connecting two or more multiprocessor systems together in a network.

When networking multiprocessor systems together, it is common to employ one of the processors as a communications link and intersystem communications manager. This dedicated processor handles all of the communications between processors in the network.

Although this scheme allows for intersystem communication between processors, the use of a processor as the communications link through which all processor to processor communications is funnelled creates a bottleneck which acts to limit the information throughput rate. Since high speed and high throughput are always desirable parameters in computer systems, there is a need to provide a multisystem network which operates in a rapid and efficient manner to accomplish intersystem communications.

BRIEF DESCRIPTION OF THE INVENTION

The network of the present invention consists of a ring of clusters, or nodes, each of which is itself a multiprocessor system. Each cluster is connected to two cluster modules and, each of which connects to two other adjacent neighboring cluster modules by means of two bi-directional links, forming a dual bi-directional ring. Any processor in any cluster may communicate with any other processor in any cluster although each cluster communicates directly only with its two adjacent neighbors.

A cluster module acts as an interface to connect each cluster to the serial data links and to the inter-processor bus of the local system. Contained in each interface module are a series of buffer memory locations, each dedicated to a particular processor in the system to which it is interfaced and each having the capacity to store a plurality of packets of information. Since there are two directions around the cluster ring, a separate set of buffers is provided for each direction (right or left) around the ring. Packets for any processor are sent around the ring in a given direction successively via one cluster at a time. At each cluster module the packets are placed in the buffer associated with the destination processor which is to receive the message.

Because there are two rings and two possible directions around each ring, there are four possible message paths. The network attempts to send the messages over the shortest possible route. If there is a failure in the communications path chosen, the system will send the message over an alternate functioning route.

In order to efficiently manage the communications between processors, the buffer memory control circuitry utilizes upper and lower thresholds in buffer capacity, which when reached cause the cluster module controller to tell its neighbor (and local interprocessor bus) to cease or commence sending of packets for that particular destination. Packets to a given processor are sequentially numbered and the buffers are managed in a FIFO manner in order to allow for error detection and recovery by the system.

An algorithm is provided to select which interprocessor packets to send in any given time in order to avoid favoring one processor or group of processors over others.

An object of the invention is to provide for multisystem multiprocessor systems intercommunications which overcome the shortcomings of the prior art.

Another object of the invention is to provide for multisystem multiprocessor intercommunications which take place at a speed greater than previously possible.

A further object of the invention is to provide for multisystem multiprocessor intercommunications without the need for use of one dedicated processor to manage those communications.

Still a further object of the invention is to provide for multisystem multiprocessor communications in an environment utilizing several redundant pathways for enhanced reliability.

These and other objects of the present invention will become apparent to those skilled in the art from the following detailed description of the invention and accompanying drawings.

The preferred embodiment of this invention will be disclosed for use in conjunction with multisystem multiprocessor machine environments, employing multiprocessor systems of the type disclosed in U.S. Pat. No. 4,228,496 to Katzman, et al, which is expressly incorporated herein by reference although it will be apparent to those skilled in the art that it will be readily applicable to other configurations of multiprocessor systems.

BRIEF DESCRIPTION OF THE DRAWINGS

FIG. 1 is a multiprocessor system of the type suitable for use in the present invention.

FIG. 2 is a multiprocessor system as is shown in FIG. 1, but modified for use with the present invention.

FIG. 3 is a network configured using multiprocessor systems as shown in FIG. 2.

FIG. 4 is a detailed block diagram of a cluster module which may be used in the present invention.

FIG. 5 is a diagram of the packet format which may be used with the present invention.

DETAILED DESCRIPTION OF THE INVENTION

FIG. 1 depicts the processors and interprocessor communications portion of a multiprocessor system having processors 10 each connected to an X interprocessor bus 12 and a Y interprocessor bus 14. Each of the interprocessor busses 12 and 14 is connected to an identical interprocessor bus controller 16 (IPB controller) which controls the data flow and other operations of the processors 10 in the manner disclosed in U.S. Pat. No. 4,228,496, incorporated herein by reference.

As is apparent from FIG. 1, each processor 10 ($P_o$-$p_n$) can communicate with each other via either of interprocessor busses 12 or 14, which provide redundant paths to allow the system to remain in operation in the event of component failure in one part of the system. For purposes of the disclosure of the preferred embodiment, the number of processors in each individual multiprocessor system will be sixteen (n=16), however those skilled in the art will recognize that with minor modifications of instruction word field lengths, register lengths and other obvious hardware/software changes to accomodate other numbers of processors, the system of the present invention will operate with a number of processors greater or smaller than sixteen.

It is with respect to a multiprocessor system of the type depicted in FIG. 1 that the present invention will be disclosed, although those skilled in the art will recognize that the invention is equally applicable to multiprocessor systems not providing the multiple path redundancy of the system disclosed in U.S. Pat. No. 4,228,496. It will be appreciated, however, that such a network will not have as many possible data paths.

Referring now to FIG. 2, the basic building block of a system network built according to the present invention is depicted. As in FIG. 1, the multiprocessor system of FIG. 2 contains a plurality of processors 10 communicating on X and Y interprocessor busses 12 and 14, respectively. Unlike the system in FIG. 1, however, the multiprocessor system of FIG. 2 does not use an IPB controller 16 to act as an interface for both of its X and Y interprocessor busses 12 and 14. Instead, at each of the X and Y busses 12 and 14, each multiprocessor system used in the present invention interfaces to the network via X and Y cluster modules 18 and 20. X-cluster-module 18 sits on the X-bus and Y-cluster-module 20 sits on the Y-bus. Segments of X-left serial data link 22 and X-right serial data link 24 can be seen running from X-cluster module 18 and similar segments of Y-left and right serial data links 26 and 28 can be seen running from Y-cluster module 20. X and Y cluster modules 18 and 20 are identical in structure and will form the basis for a dual ring network.

As will be more clearly seen with reference to FIG. 4, X and Y cluster modules 18 and 20 each contain an interprocessor bus controller (IPB controller) 30 interfacing directly with the X or Y interprocessor busses 12 or 14. The functioning of IPB controller 30 in the present invention is the same as is disclosed in U.S. Pat. No. 4,228,496 for the interprocessor bus controller disclosed therein for the purposes of controlling intra-system local interprocessor bus communications excep in the following three respects.

In the multiprocessor system disclosed in U.S. Pat. No. 4,228,496, individual processors 10 are polled in sequence to ascertain if any has a message to send to other processors 10. This polling sequence is initiated by the IPB controller when a signal called SNDREQ is received by the IPB controllers from the control bit portion of the interprocessor bus indicating that a processor has a packet to send to another processor.

In the present invention, the SNDREQ signal is assumed to always be asserted. The result is that system processors are constantly polled to ascertain if any has a packet or packets to send to any other processor in the same system or any other system in the network. Operation of this aspect of the IPB controller 30 and cluster module 18 will be disclosed more fully with respect to FIG. 4.

In addition, processors are polled in a nonsequential manner as opposed to the sequential manner used in the system of U.S. Pat. No. 4,228,496.

The third difference is the added ability of the IPB controller of the present invention to send and receive packets to and from external sources as will be more fully disclosed with respect to FIG. 4.

The multisystem network of the present invention is achieved when several systems of FIG. 2 are connected together to form a network wherein any processor in the network is capable of communicating with any other processor in the network at a high rate of speed, such as 1 megabyte/sec, as compared with the typical speed of only 7000 bytes/sec across conventional communications links. Such a configuration is depicted in FIG. 3.

Referring now to FIG. 3, a dual bidirectional ring configured network of several multiprocessor systems, comprising processors 10 connected to X and Y interprocessor busses 12 and 14, terminated in interface X and Y cluster modules 18 and 20, is shown. Although only four of such systems are shown in FIG. 3, formed into a dual bidirectional ring network via X-cluster modules 18a, 18b, 18c and 18n and Y-cluster modules 20a, 20b, 20c and 20n, in the presently preferred embodiment, there may be up to fourteen multiprocessor systems configured in a ring structure like that of FIG. 3, since cluster number 0 is reserved for indicating local interprocessor bus transfers and cluster number 15 is reserved for monitoring and controlling cluster modules. A smaller or larger number of multiprocessor systems may be used without departing from the concepts of the present invention. Those skilled in the art will readily understand from this disclosure how larger or smaller numbers of multiprocessor systems may be configured according to the present invention.

In FIG. 3, one ring of the dual ring structure is shown having as its nodes the X-cluster modules 18 and the other is shown having as its nodes the Y-cluster modules 20. The X-cluster modules are connected together by serial data links, the X-left links 22a, 22b, 22c and 22d and the X-right links 24a, 24b, 24c and 24d. As suggested by its name, each of the links 22 and 24 transfers data only in one direction. Similarly, the Y-cluster modules 20 are connected together via links, Y-left links 26a, 26b, 26c and 26d and the Y-right links 28a, 28b, 28c and 28d. Thus, it can be seen that there are four paths which may be taken for information to travel from one cluster module to another, i.e., on any one of links 22, 24, 26 and 28.

Links 22, 24, 26 and 28 are preferably high speed fiber optic cables as are known in the art for data transmission use. Such cables interface with X and Y cluster modules 18 and 20 through the use of fiber optic interfaces (not shown) known in the art for such uses. Those skilled in the art will understand that links 22, 24, 26 and 28 may also be electronic lines rather than fiber optic cables and will understand the us of either without the need for further description herein.

Because of the multiplicity of hardware paths which can be used in inter-cluster communication, it can be seen that not only is a more reliable system possible due to the redundancy of data paths provided, but also, as will be shown, the paths can operate independently and may be used simultaneously thus providing up to four times the throughput possible if only a single ring path was used.

The management and control of information which is traveling inter-system via the ring, i.e., from a processor 10 in one system to another processor 10 in another system, is handled by the logic and intelligence contained within the cluster modules 18 and 20.

Each X-cluster module 18 in a multisystem network configured according to the present invention directly communicates only with its two adjacent neighbor cluster moldules. For instance, X-cluster module 18b shown in FIG. 3 communicates only with X-cluster module 18a to its immediate left and X-cluster module 18c to its immediate right. Likewise, Y-cluster module 20b communicates directly only with Y-cluster modules 20a and 20c to its immediate left and right.

Since both X and Y cluster modules are identical and function in an identical manner, disclosure of the operation of the network herein will be with reference only to X-cluster modules 18, it being understood that such disclosure is equally applicable to transfers of packets in either direction around the Y-cluster module ring.

Since each cluster module 18 can communicate directly only with its two adjacent neighbors, overly complex system control is unnecessary. Any cluster module 18 may communicate by sending and receiving packets in three directions: with its left-hand neighbor, with its right-hand neighbor, and with the processors 10 on the local interprocessor bus 12 to which it is connected.

By way of example, and for simplification, reference to cluster module 18b of FIG. 3 shows that it may send packets to cluster module 18a via X-left serial data link 22b, to cluster module 18c via X-right serial data link 22c, and to any processor 10 on its own local X interprocessor bus 12b.

Since any processor may communicate with any other processor, any node must be able to handle traffic sent by and destined for any processor, and some means must be provided to efficiently manage this enormous potential of information transfer.

In the present invention, cluster module 18b, as illustrative of all cluster modules 18, manages all of these packet transfers via an internally-located buffer memory. The buffer memory is arranged so that each processor in the entire ring has some space assigned to it within the buffer with a capacity for a fixed number of packets. Half of the fixed capacity is dedicated for transfers in the left direction and half is dedicated for transfers in the right direction. The space assigned to each processor is arranged as a FIFO queue so that packets destined for any given processor are delivered in the same sequence that they are sent. A single sequence check can be used by the destination processor to ascertain whether it has received all packets sent to it, thus providing for error detection and recovery.

In the presently preferred embodiment, the buffer memory space for each processor in the network in each direction around the ring will accommodate 16 packets, although with appropriate and obvious hardware and software changes, provision may be made for smaller or larger capacity. This feature of the invention and the description which follows, may be easily understood with reference to FIG. 4.

From an examination of FIG. 4, cluster module 18b is seen to consist of four main functional blocks, IPB controller 30, cluster module controller 32, buffer memory 34, and serial data link controller 36.

The IPB controller 30 handles all local packet transfers between processors located on X interprocessor bus 12b (local transfers), and packet transfers in and out of the ring to and from any processor on interprocessor bus 12b.

Cluster module controller 32 manages and controls all packet transfers in and out of the node comprising cluster module 18b, in conjunction with buffer memory 34. It also controls the operation of IPB controller 30 with respect to transfer of packets beyond the confines of the processors located on interprocessor bus 12b and the transfer of packets in and out of the node via serial data link controller 36, which accomplishes the actual transfer of packets between the node and serial data links 22 and 24.

The operation of cluster module 18b can best be understood with reference to its function when sending and receiving packets.

When packets are to be moved out of buffer memory 34, they have two possible destinations, either a processor on local X interprocessor bus 12b or a neighboring buffer memory 34 in cluster module 18a or 18c.

When a packet is to be sent from buffer memory 34 to a neighboring cluster node 18a or 18c, serial data link controller 36 is involved. Serial data link controller 36 is seen to include cluster module controller interface 38, as well as other hardware for transmitting and receiving packets.

Specifically, serial data link controller 36 includes left and right OUTQ buffers 40 and 42 respectively, left and right parallel to serial converters and CRC generators 44 and 46 respectively, left and right transmitters 48 and 50 respectively, left and right receivers 58 and 60 respectively, left and right serial to parallel converters and CRC checkers 62 and 64 respectively, and left and right INQ buffers 66 and 68 respectively.

Since the left and right portions of serial data link controller 36 are identical, reference will be made to the left portion only, with the understanding that the right portion functions identically.

Packets transfered on the serial data links are enveloped within a frame. In addition to the packet, each frame includes control words. These control words are used for flow control, specifically start and stop messages.

Left OUTQ buffer 40 is a double buffer, having capacity to store two packets of information awaiting transmission over left serial data link 22. When one or both of its sections is empty, it asserts a buffer not full flag, which is read by cluster module controller 32. When both sections of left OUTQ buffer 40 are full, this flag is not asserted and the packets it contains are being transmitted as will be disclosed more fully later.

When, however, left OUTQ buffer 40 has asserted its buffer not full flag, cluster module controller 32 attempts to fetch a packet from buffer memory 34 to fill it for transmission to left serial data link 22. For this purpose, cluster controller 32 utilizes information stored in its control memory 52 in a ready list. This ready list is a double linked list, as is known in the art, where each item on the list carries a reference address to the previous item and the next item on the list, and functions as follows.

When packets have arrived into cluster module 18b, cluster module controller 32 examines the packet word containing identification of the destination cluster number and destination processor number assigned to the packet. These numbers, combined with a bit indicating the direction in which the packet is moving around the ring, are used as an address in the ready list in control memory 52. At this address is a table consisting of a series of memory locations. One location in the table is a buffer memory address pointing to the oldest packet in the FIFO queue (head of the queue). The buffer memory address pointing to the tail of the FIFO queue, where the next packet should be placed, is derived by adding the packet count (described next), modulo 16, to the head of the queue pointer. Another location in the table contains a record of the number of packets (packet count) stored in buffer memory 34 destined for the particular cluster and processor. This number is incremented by cluster module controller 32 when a packet is placed in the buffer memory 34.

The other two locations contained in the table in the ready list in control memory 52 contain the addresses in control memory 52 of the previous item and next item on ready list in control memory 52.

Another location in control memory 52 holds a pointer called first item, referring to the address of the first item on the ready list. It is to this location which cluster module controller goes when it wishes to place a packet into left OUTQ buffer 40.

At that location, it fetches the address in buffer memory 34 containing the packet to be sent (head of the queue pointer), goes to that address and takes the packet and transfers it to left OUTQ buffer 40, decrements the packet count, adjusts the head of the queue pointer, and sets the first item pointer to the value found in the next item location. If the decremented packet count has passed the lower threshold value, cluster module controller 32 generates a start signal to send to its left hand cluster module neighbor and resets the appropriate bit in the INQ STAT table as will be described below. If the decremented packet count has reached zero, cluster module controller 32 removes the destination cluster and processor from the ready list since it has nothing to send and the system avoids needlessly polling.

Since left OUTQ buffer 40 is a double buffer, cluster module controller 32 can be filling half of it with a packet while left CRC generator and parallel to serial converter 44 and left transmitter 48 are sending the packet contained in the other half of left OUTQ buffer 40. Left CRC generator and parallel to serial converter 44 and left transmitter 48 are clocked by an internal transmit clock (not shown) in a conventional manner.

If a control word in an incoming frame contains a stop message from the immediate left hand neighbor of cluster module 18, this stop word is recognized by cluster module controller 32, which fetches the table associated with the destination cluster and processor from control memory 52 and effectively removes it from the ready list. This is accomplished in the manner known in the art for removing items from a doubly linked list.

Cluster module 18b is also capable of transmitting a packet to any processor on it own local inter-processor bus 12b.

When such a packet is retrieved from buffer memory 34, it is recognized and transferred to IPB controller 30 and placed in the OUTQ buffer 54 associated with a particular processor on the local IPB bus 12b. There is one OUTQ buffer location with a single packet capacity for each processor on the local IPB bus 12b.

Associated with OUTQ buffer 54 is OUTQ STAT 56, a register having one bit position for each location in OUTQ buffer 54. When the IPB controller wants to transmit a packet to a processor on the local bus, it first examines the contents of OUTQ STAT register bit associated with processor. If that bit is set, it means that the corresponding OUTQ buffer is full and the IPB controller must wait until its present packet has been transferred to the local destination processor before the next packet may be placed in that location in OUTQ buffer 54. Whenever a transfer from OUTQ buffer 54 to a local destination processor takes place, its corresponding OUTQ STAT bit is reset to signal its readiness to accept another packet for transfer to a local destination processor via local inter-processor bus 12b.

Packets arrive at cluster module 18b via left or right receivers 58 and 60 respectively, and through left or right CRC checker serial to parallel converters 62 and 64 respectively. Arriving packets are self-clocked through the receivers 58 or 60, having been formatted in Manchester type code or another selfclocking clocking code known in the art.

Once converted to parallel form, incoming packets are placed in INQ buffers 66 or 68. INQ buffer 66 is a double buffer, configured in that manner so that one portion of it may be filled by CRC checker/serial to parallel converter 62 as the other portion is being emptied by cluster module controller 32. INQ buffer 68 is identical in structure and function.

Cluster module controller 32 reads the destination cluster and processor number of the incoming packet. If the packet is not destined to be passed through to another cluster module 18, but is destined for a processor 10 on the local inter-processor bus, as determined by comparing the destination cluster number of the packet with the cluster number of the cluster module, several things occur. A local IPB ready list, similar to the one previously described, is accessed using the destination cluster and processor number as an address. The packet is stored in buffer memory 34 at the location specified by an address in the table obtained from the local IPB ready list, and the packet count in the table is incremented. If the new count has passed the upper threshold, a stop message is generated to be sent in the appropriate direction and the appropriate bit in the INQ STAT table is set as will be described later. If the previous packet count was zero, a flag is set indicating that the buffer for that particular processor has something to send. This flag is located in a word in control memory 52 which has a one bit flag for each processor on the local inter-processor bus 12b.

If the incoming packet is destined for another cluster module 18, the destination cluster and processor number is used as an address to access the appropriate table in ready list in control memory 52. The packet is placed in the address in buffer memory 34 specified in the ready list table, and the packet count (in the table) is incremented by cluster module controller 32. If the number of packets in the buffer now exceeds the upper threshold, cluster module controller 32 generates a stop message to send in the direction from which the packet came and sets the appropriate bit in the INQ STAT table as will be described below. If the previous number of packets in storage in that location in buffer memory 34 was zero, that destination cluster and processor for which the incoming packet is destined is not on the ready list, so cluster module controller 32 inserts it into the double linked ready list immediately behind the location specified by the pointer indicating the first item. If, however, there has been a stop message sent from the cluster module to which the packet is to be sent next, the entry will not be made to the ready list.

Packets are also generated on the local interprocessor bus 12b for transmission through the ring. They are handled first by the IPB controller 30.

During the poll cycle, the first word of a packet appears on the interprocessor bus 12b, and the IPB controller recognizes it as a request for an external transfer if the destination cluster number is non-zero. The destination cluster and processor number is used by the IPB controller as an address into an INQ STAT table 70 located in the IPB controller. If a stop message has been sent with respect to the buffer location which is the intended resting place for the packet, a bit will be set at the address in the INQ STAT table 70 pointed to by the first word of the packet and will, when recognized at this time, prevent the transfer from taking place. No transfer of packets to INQ buffer 72 can take place while cluster module controller 32 is addressing INQ STAT table 70.

If, however, the stop bit for that packet's destination has not been set in INQ STAT table 70 the IPB controller looks to see if the INQ buffer 72 is full by examining its flag. If the INQ buffer 72 is full, no transfer takes place, if it is empty the packet is transferred to INQ buffer 72 in IPB controller 30 and the INQ buffer full flag is set. This flag is periodically examined by cluster module controller 32 and if it is found to be set, the contents of INQ buffer 72 are transferred to the appropriate location in buffer memory 34 and INQ buffer flag is reset. The ready list is then updated as described with respect to packets being received from the serial data links 22 or 24.

Understanding of the present invention may be facilitated by examination of the manner in which hardware and software cooperate to transfer data between processors. Transmission of data from a processor to a processor in another multiprocessor system is initiated and accomplished under software control by means of the SEND instruction.

In the SEND instruction the processor 12a of FIG. 3 reads a data block from its memory, breaks it up into packets (see FIG. 5 for packet format), calculates packet checksum words, and transmits the data block one packet at a time to the cluster module 18a. Parameters supplied to the SEND instruction specify the use of the X (24a) or Y (28a) cluster module, the starting packet sequence number, the direction in which the packet is to be sent around the ring, the identity of the receiving cluster module, the identity of the receiving processor within the multiprocessor system connected to the receiving cluster module, the starting address of the data block, the number of bytes in the data block, and the initial timeout value to wait for the outqueue 67 of FIG. 2 of U.S. Pat. No. 4,228,496 to become available.

If the packet is destined for a processor within a different cluster, the sender cluster number contains routing information. The cluster module, in turn, examines the routing information, determines which direction the packet should be sent from this information, and then replaces the routing information with the sender cluster number.

The SEND instruction terminates only after the entire block has been transmitted; thus sending a block is a single event from the software viewpoint.

Receiving of data by a processor of a multiprocessor system ((b) of FIG. 3) is not done by means of a software instruction since the arrival times and sources of data packets cannot be predicted. The receiving of data must be enabled but cannot be initiated by the receiver.

The processor accepts a packet from the cluster module 24b (FIG. 3) by executing a bus receive microprogram (reference 115 of U.S. Pat. No. 4,228,496) which takes the received data packet from the inqueue section of the inter-processor control 55 of U.S. Pat. No. 4,228,496, verifies the correct checksum and sequence number, and stores the data in a memory buffer.

Reassembly of received packets into blocks is accomplished using bus receive table entries in memory. A bus receive table entry corresponds to a specific multiprocessor system ((a) of FIG. 3) and processor 12a of FIG. 3 within that system. The bus receive table entry contains a memory address, a count word, and an expected sequence number.

As each data packet is received, the bus receive microprogram is activated. This microprogram accesses the bus receive table entry that corresponds to the sending multiprocessor system and processor within that system. If the received packet contains a correct checksum and if its sequence number matches the expected sequence number, the data words of the packet are stored into the specified area and the area address, sequence number and count in the bus receive table entries are adjusted for receipt of the next packet in sequence. If the count has reached zero or if any error is detected, a software interrupt is caused.

Reliable message transmission is accomplished by a transmission protocol implemented between processors of the multiprocessor system. Each transmission that is received without indication of error is positively acknowledged by a subsequent transmission from the receiving processor to the sending processor. If a processor, having sent a transmission, fails to receive such an acknowledgment within a specified time interval, software in the sending processor will send the transmission again and then wait once more for the specified time interval.

The successive transmissions are switched through the two cluster modules 24a and 28a and through both of the possible directions around the ring. Thus, if any one of the four possible paths from a processor to another processor is functioning correctly, the message can be transmitted. If a failure of a path causes loss of the acknowledging message after successful receipt of a transmission, the re-transmissions by the sending processor will cause packets that are out of sequence to be received at the receiver. The receiver will then re-send the acknowledgment over all four possible paths. Thus, messages can be successfully transmitted and acknowledged if any one of the four paths from the sender to the receiver and any one of the four paths from the receiver to the sender are functional.

Although the invention has been disclosed with respect to a preferred embodiment, those skilled in the art will recognize from the within disclosure that other embodiments of the present invention may be configured without departing from the spirit of the disclosure which embodiments remain within the scope of the invention. Therefore, the scope of the present invention is to be limited only by the appended claims.

What is claimed is:

1. A network of multiprocessor systems, including:
a plurality of multiprocessor systems, each of said systems containing at least one processor connected to an interprocessor bus, a plurality of node interfaces, each connected to a respective one of said interprocessor busses, and connected to each other in the form of a ring by a data link, a buffer memory in each of said node interfaces, having a plurality of storage locations for temporarily storing message packets to be transferred to any one of said processors in said network, said storage locations being partitioned into groups of storage locations, each one of said groups corresponding to a particular one of said processors in the network which is the destination processor for all of said message packets placed at locations therein, control means in each of said node interfaces for controlling the transfer of said message packets into the buffer memory in its respective node interface from the data link connecting the respective interface node to its adjacent neighbor interface node and from the interprocessor bus connected to the respective interface node, and for controlling the transfer of said message packets out of the buffer memory in the respective node interface to the data link connecting the respective interface node to its adjacent neighbor interface node and to the interprocessor bus connected to the respective interface node means, in each of said control means, for determining when a group of storage locations (in the buffer memory in its node interface) corresponding to a particular destination processor is full, and for halting the transfer of said message packets for that destination processor while said group of storage locations is full.

* * * * *